United States Patent
Kawakami et al.

(10) Patent No.: US 6,273,102 B1
(45) Date of Patent: Aug. 14, 2001

(54) METHOD OF CLEANING AND MAINTAINING PETROLEUM REFINING PLANTS

(75) Inventors: Katsuhiko Kawakami; Junichi Takano; Guiqing Xu, all of Tokyo (JP)

(73) Assignees: Softard Industries Co., Ltd., Tokyo; Nicca Chemical Co., Ltd., Fukui, both of (JP)

( * ) Notice: Subject to any disclaimer, the term of this patent is extended or adjusted under 35 U.S.C. 154(b) by 0 days.

(21) Appl. No.: 09/332,036

(22) Filed: Jun. 14, 1999

(30) Foreign Application Priority Data

Jun. 16, 1998 (JP) .................................................. 10-168444

(51) Int. Cl.$^7$ ........................................................ B08B 9/00
(52) U.S. Cl. .................. 134/22.1; 134/22.12; 134/22.16; 134/22.17; 134/22.19; 134/26; 134/28; 134/29; 134/30; 134/34; 134/36; 134/41; 134/42; 502/29; 502/31
(58) Field of Search ...................... 502/29, 31; 134/22.1, 134/22.12, 22.16, 22.17, 22.19, 26, 28, 29, 30, 34, 36, 41, 42

(56) References Cited

U.S. PATENT DOCUMENTS 4,031,031 * 6/1977 Yamaguchi et al. .................. 252/414
4,155,875 * 5/1979 Yamaguchi et al. .................. 252/414
4,912,071 * 3/1990 Kaijima et al. ........................ 502/26

FOREIGN PATENT DOCUMENTS

61185330 * 8/1986 (JP) .

* cited by examiner

*Primary Examiner*—Sharidan Carrillo
(74) *Attorney, Agent, or Firm*—Lowe Hauptman Gilman & Berner, LLP

(57) ABSTRACT

A repairing method of a petroleum refining plant for efficiently conducting cleaning process of process equipment and pipings, unloading process of agglomerated catalyst, rinsing work of the process equipment and the pipings, thereby reducing plant shutdown time, preventing stress-corrosion cracking by polythionic acid, improving production efficiency, ensuring work safety and reducing production cost, is provided. For the object, the repairing method of the petroleum refining plant of the present invention has a first step of cleaning the process equipment and the pipings and softening agglomerated catalyst inside the process equipment, second step of rinsing the process equipment and the pipings and coating a surface of the softened catalyst by a coating agent, and third step of dumping the coated catalyst from the process equipment and re-rinsing the process equipment and the pipings. Accordingly, respective work can be efficiently conducted, the plant shutdown time can be reduced, the stress-corrosion cracking by the polythionic acid can be prevented, and work safety, reduction of maintenance cost and improvement of production efficiency can be ensured.

7 Claims, 1 Drawing Sheet

METHOD OF CLEANING AND MAINTAINING PETROLEUM REFINING PLANTS

BACKGROUND OF THE INVENTION

1. Field of the Invention

The present invention relates to petroleum refining plants. More specifically, the present invention relates to method of cleaning and maintaining a petroleum refining plant, in which process equipment such as a furnace, reactor, heat exchanger and stripper are chemically cleaned, and rinsed after a softening catalyst agglomerated in the reactor and a surface of the catalyst softened by the chemical cleaning is coated and passivated, these processes being combined and conducted simultaneously.

2. Description of Related of Related Art

Crude oil is refined and various products and feed materials for chemical petroleum plant are manufactured in a petroleum refining plant, in which various catalysts are used. Catalyst activity deteriorates during continuous plants operation due to coking, poisoning or the like. Accordingly, periods repair to exchange the catalyst is necessary. The catalyst is exchanged by initially unloading the spent catalyst and subsequent loading of new catalyst.

The catalyst is mainly exposed to a reducing atmosphere during operation of the aforesaid petroleum refining plant. Therefore, when thus reduced catalyst is exposed to the air for replacement, the catalyst is oxidized to generate heat, thus causing possible ignition of carbide, sulfur and the like adhered to the catalyst during operation.

Therefore, after the catalyst beds are cooled from a high temperature (350 to 450° C.) to a lower temperature capable of conducting the unloading work (40 to 50° C.), the catalyst is dumped out in a nitrogen atmosphere by introducing the nitrogen gas into the reactor. Alternatively, a predetermined chemical is added while cooling the catalyst to coat the surface of the catalyst and passivate before unloading the catalyst.

In the aforesaid petroleum refining plant, since the catalyst reacts in a high temperature, the catalyst is agglomerated during the reaction by metal compound, sulfide, coke and other impurities. Thermal conductivity of the agglomerated catalyst is greatly deteriorated and the catalyst is not sufficiently cooled during cooling process. Accordingly, work efficiency for unloading the agglomerated catalyst is lowered, resulting in longer shutdown maintenance term.

In order to facilitate ways dumps out of the agglomerated catalyst, the catalyst is immersed in a surface active agent to soften the agglomerated catalyst.

However, since the waste water after softening the agglomerated catalyst contains compounds contaminating the environment, waste water treatment is necessary. Further, since the catalyst inevitably contacts the air, the dumping process is likely to be dangerous.

Contamination is generated in the process equipment, piping and on a surface of heat-transfer equipment (such as furnace, heat exchanger and stripper) during normal operation in the aforesaid petroleum refining plant.

When the contaminant is generated in piping, for example, the quality of the products deteriorates and production efficiency is lowered since the fluid flow is restricted. In an extreme case, the line may be choked and the devices may be damaged. When the contaminant is generated on the heat-transfer surface, excessive duty is required to the equipment to accelerate deterioration and abrasion of metal and to increase fuel cost.

Therefore, a work for removing the contaminant adhered to the piping and the heat-transfer surface of the process equipment so-called equipment cleaning, is required.

Various chemical cleanings by cleaning fluid are developed as the equipment cleaning.

The chemical cleaning is mainly composed of cleaning process for removing the contaminants from the surface of the equipment and rinsing process for forming clean fluid coat on the surface. In the chemical cleaning, the cleaning fluid is introduced into the equipment and is heated to a predetermined temperature. The heated cleaning fluid is circulated to remove the contaminant from the equipment. Subsequently, water rinsing fluid is used to rinse the equipment.

The aforesaid various methods, i.e., coating the surface of the catalyst to safely unload the catalyst in the air, softening the agglomerated catalyst to easily dump out, and chemical cleaning of the equipment to maintain the operation efficiency of the plant, are developed independently and are conducted as separate processes.

Accordingly, plant shutdown term gets longer, thereby deteriorating the production efficiency.

SUMMARY OF THE INVENTION

The object of the present invention is to provide a cleaning and maintenance method for efficiently a conducting cleaning process of process equipment and pipings, unloading process of agglomerated catalyst, rinsing work of the process equipment and the piping in a petroleum refining plant, thereby reducing plant shutdown term, preventing stress-corrosion cracking by polythionic acid, improving production efficiency, ensuring work safety, and reducing production cost.

Specifically, it is noticed in the present invention that the catalyst is necessary to be cooled from a high temperature to a temperature capable of conducting the unloading work in order to dump out the catalyst. Accordingly, the entirety of the coating process of the catalyst, softening process of the catalyst, chemical cleaning of the equipment etc. are designed to be efficiently and effectively during the cooling time in the present invention, thereby reducing maintenance term of the plant.

More specifically, a repairing method of a petroleum refining plant according to the present invention is for a petroleum refining plant having various process equipment including equipment using various catalysts and pipings connecting the process equipment. The repairing method of the petroleum refining plant includes following steps of: first step of cleaning the various process equipment and the pipings and simultaneously softening agglomerated catalysts inside the process equipment; second step of rinsing the various process equipment and the pipings and simultaneously coating a surface of the softened catalyst by a coating agent; and third step of unloading the softened and coated catalyst from the process equipment containing the catalyst and simultaneously re-rinsing the various process equipment and the pipings.

In the above, the repairing method refers to conduct unloading of the catalyst, accompanying cooling, softening, coating of the catalyst, and rinsing of the equipment etc. The repairing method may be conducted regularly and/or irregularly. A predetermined chemical is preferably used for cleaning the process equipment and softening the agglomerated catalyst. However, the usage is optional. Another predetermined chemical is preferably used for rinsing the equipment and coating. The catalyst may be unloaded from the process equipment from an outlet provided to a lower portion of the equipment by virtue of gravity or, alternatively, from an upper manhole of the facility by vacuum.

In the present invention, since the process for chemically cleaning the equipment, softening the agglomerated catalyst, and coating the surface of the catalyst can be conducted in harmony in a single system, the advantages of respective process can be well performed so that the cleaning process of the process equipment and pipings, unloading process of the agglomerated catalyst, rinsing process of the process equipment and pipings can be efficiently conducted. Accordingly, the plant shutdown term can be reduced, thereby improving production efficiency.

In the above arrangement, the process equipment and the pipings are preferably cleaned by cleaning fluid having cleaning and softening effect introduced into light oil circulating in plant system, the process equipment and the pipings are preferably rinsed by a first rinsing fluid including light oil, and re-rinsed by a second rinsing fluid including water.

In the above arrangement, since the cleaning fluid having cleaning and softening effect introduced into light oil circulating in the system is introduced to the catalyst agglomerated in the reactor, the catalyst can be softened to particles, so that more complete coat can be formed on the surface of the catalyst. Accordingly, the unloading process of the catalyst can be conducted more safely. Further, since the grained catalyst has increased cooling speed, the cooling time of the catalyst can be reduced.

Here, since heat exchanger, reactor etc. of a hydrogen desulfurization unit is operated in high temperature and high pressure under high concentration % of hydrogen sulfide, an austenitic stainless steel is used for the heat exchanger and reactor etc. Accordingly, iron sulfide is generated onto the surface of the steel during operation. When the equipment is made open, the iron sulfide reacts with the air to generate polythionic acid, which is thought to cause stress corrosion cracking.

However, since alkali cleaning fluid and rinsing agent are used in the present invention, so-called neutralization cleaning, in which sulfide inside the equipment can be neutralized during the cleaning and rinsing of the equipment, can be simultaneously conducted. Therefore, the polythionic acid stress-corrosion cracking can be prevented when the equipment is made open.

In the present invention, the various process equipment and the pipings are preferably cleaned when the temperature of the catalyst is lowered to a predetermined temperature while cooling the catalyst before the plant is suspended.

In the above arrangement, the predetermined temperature while cooling the catalyst is preferably approximately 160° C.

Since the cleaning process is conducted when the catalyst is lowered to the predetermined temperature in the present invention, the cleaning fluid can be used in the most suitable condition, thereby enabling secure cleaning.

In the present invention, the cleaning fluid is preferably selected from the group consisting of limonene, lecithin, polyoxyethylene fatty amide, alkyl benzenesulfonic acid, N-methyl-2-pyrolidone, dimethyl sulfoxide, and nonyl phenol.

In the above arrangement, since the cleaning fluid and the first rinsing fluid is oil, the waste liquid can be re-distilled and collected as light oil, or alternatively, utilized as blend material of heavy oil. Accordingly, there is no burden of waste liquid treatment.

In the present invention, the process equipment and the pipings are preferably rinsed and the surface of the catalyst is coated during the second step by introducing light oil and the coating agent into the plant system after drawing off the cleaning fluid.

In the above arrangement, since the catalyst is coated after being softened to particles, more complete coat can be formed on the surface of the catalyst. Accordingly, the dumping process of the catalyst can be conducted more safely. Further, since the grained catalyst has increased cooling speed, the cooling time of the catalyst can be reduced.

In the present invention, the coating agent is preferably selected from the group consisting of condensed ring aromatic hydrocarbon such as alkyl naphthalin, alkyl anthracene and alkyl pyrene, condensed ring aromatic hydrocarbon having a fluoranthene ring, polycyclic aromatic hydrocarbon such as biphenyl and terphynyl, and aliphatic hydrocarbon.

In the above arrangement, since the coat is formed by alkyl naphthalin etc. after being softened to particles, more complete coat can be formed on the surface of the catalyst. Accordingly, the unloading process of the catalyst can be conducted more safely. Further, since the grained catalyst has increased cooling speed, the cooling time of the catalyst can be reduced.

The softened catalyst are preferably unloaded in the third step after cooling the catalyst to a temperature capable of unloading the catalyst and drawing off the first rinsing fluid in the present invention.

In the above, the temperature capable of unloading the catalyst is preferably less than or the same as 50° C. The catalyst may be unloaded from an outlet provided to a lower portion of the equipment by virtue of gravity, or alternatively, from an upper manhole of the equipment by vacuum.

In the above arrangement, since the catalyst is unloaded after drawing out the first rinsing fluid and cooling the catalyst to the temperature capable of unloading the catalyst, the unloading work can be facilitated and conducted safely.

DETAILED DESCRIPTION OF PREFERRED EMBODIMENT(S)

Figure 1:
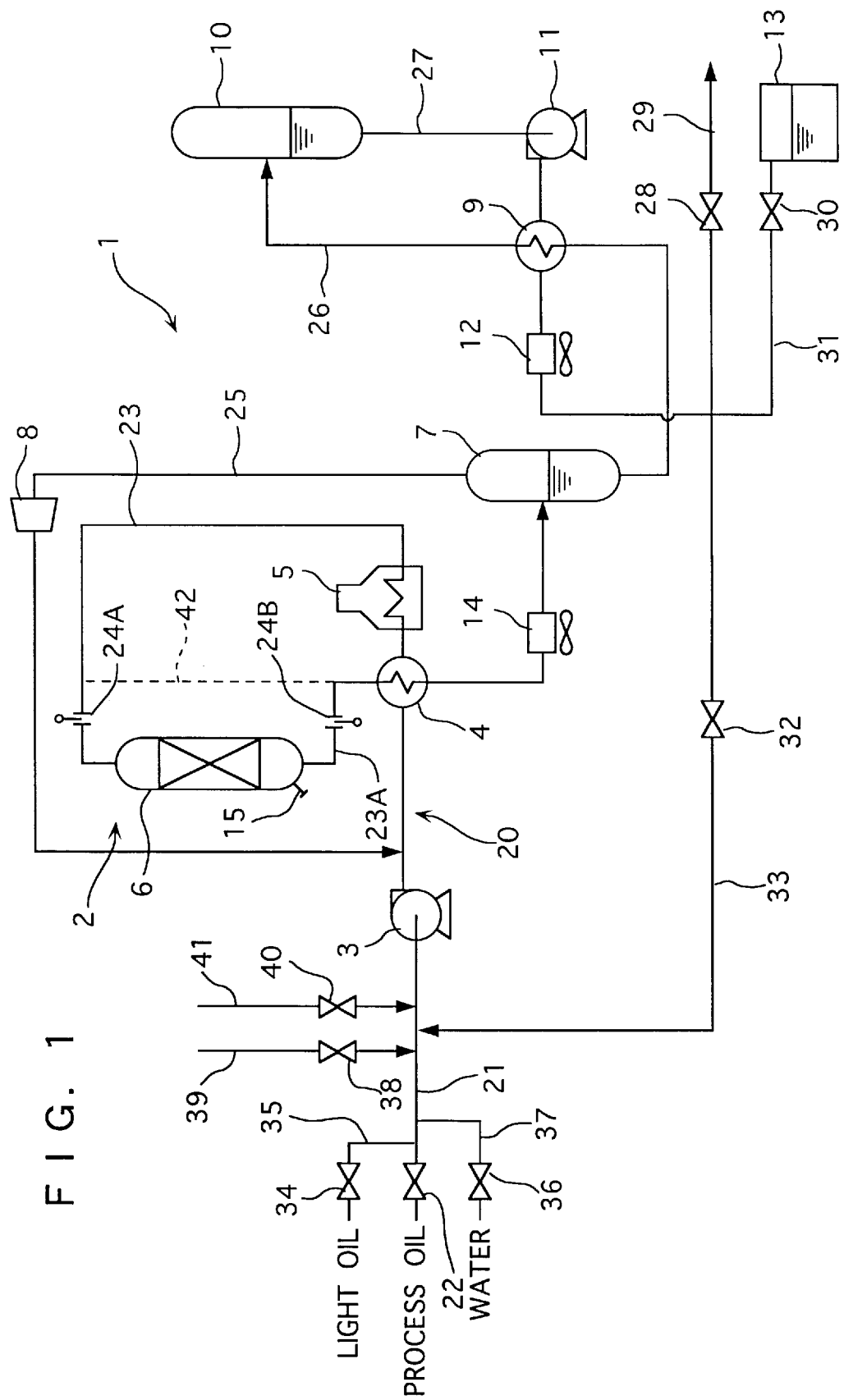
FIG. 1 is an overall schematic view showing petroleum refining plant applied with repairing method according to an embodiment of the present invention.

An embodiment of the present invention will be described below with reference to attached drawings.

As shown in FIG. 1, a petroleum refining plant 1 to be applied with the cleaning of the present embodiment has a process equipment group 2 including reactor 6 for reacting more than one material at a predetermined temperature and pressure condition, a furnace 5 for heating the material etc. to a predetermined temperature, a separator 7 for separating vapor and liquid, stripper 10 for stripping gas dissolved in fluid, and piping for connecting respective process equipment 6, 7 etc.

Feed material supply pipe 21 of piping 20 for supplying material such as heavy oil has an on-off valve 22 and a pump 3 at an intermediate portion thereof. A heat exchanger 4 and the furnace 5 are disposed on a discharge side of the pump 3.

A flange 24A for inserting a blind to shut therefront and therebehind is provided at a midway of an outlet pipe 23 connected to the furnace 5. An end of the outlet pipe 23 is connected to the reactor 6 for hydrogen desulfurization having catalyst filled therein. A reactor-bottom pipe 23A under the reactor 6 has a flange 24B for inserting the blind as described above, and the heat exchanger 4 and an air-cooling heat exchanger 14. An end of the reactor-bottom pipe 23A is connected to the separator 7.

A dumping pipe 15 for unloading the catalyst is provided on a lower portion of the reactor 6.

A gas-circulation pipe 25 is connected to a top of the separator 7. A circulated gas compressor 8 is disposed in the midway of the gas-circulation pipe 25. An end of the gas-circulation pipe 25 is connected to the feed material supply pipe 21 between the pump 3 and the heat exchanger 4. During operation of the plant 1, hydrogen gas is usually circulated in the gas-circulation pipe 25.

A heat exchanger 9 is arranged at an intermediate portion of fluid transfer pipe 26 connected to a bottom of the separator 7.

An end of the fluid transfer pipe 26 is connected to the stripper 10. A pump 11, the heat exchanger 9 and an air-cooling heat exchanger 12 are arranged at an intermediate portion of a tower-bottom fluid effluent pipe 27 connected to the bottom of the stripper 10.

An end of the tower-bottom fluid effluent pipe 27 is divided into three branches, i.e. first, second and third branches. The first branch is a tower-bottomliquid subsequent process pipe 29 having an on-off valve 28 at an intermediate portion thereof. The second branch is a transfer line 31 having an on-off valve 30 at an intermediate portion thereof, an end of the second branch being connected to a water tank 13. The third branch is a tower-bottom fluid circulating pipe 33 having an on-off valve 32 at an intermediate portion thereof, an end of the pipe 33 is connected between the on-off valve 22 and the pump 3.

A light oil supply pipe 35 having an on-off valve 34 at an intermediate portion thereof and a water supply pipe 37 having an on-off valve 36 at an intermediate portion thereof are respectively connected to the feed material supply pipe 21 at an upstream of the connection of the tower-bottom fluid circulating pipe 33 and a downstream of the on-off valve 22. Light oil and water can be supplied to the material supply pipe 21 by the pipes 35 and 37.

On downstream of the connection of the tower-bottom fluid circulating pipe 33 to the feed material supply pipe 21, a cleaning fluid supply pipe 39 having an on-off valve 38 at an intermediate portion thereof for supplying chemical as cleaning agent and softening agent for cleaning and softening the agglomerated catalyst, and a chemical supply pipe 41 having an on-off valve 40 for supplying chemical as a coating agent for forming a coat on the surface of the catalyst are respectively connected. The chemical for cleaning and softening the agglomerated catalyst and the chemical for coating the surface of the catalyst are supplied to the material supply pipe 21 through the cleaning fluid supply pipe 39 and the chemical supply pipe 41.

A pipe 42 is disposed between the upstream of the flange 24A and the downstream of the flange 24B. The fluid from the furnace 5 is circulated to the heat exchanger 4 through the pipe 42 while unloading the catalyst from the reactor 6.

Limonene, lecithin, polyoxyethylene fatty amide, alkyl benzenesulfonic acid, N-methyl-2-pyrrolidone, dimethyl sulfoxide, nonyl phenol or the like are used as the chemical for cleaning and softening the agglomerated chemical.

Condensed ring aromatic hydrocarbon such as alkyl naphthalin, alkyl anthracene and alkyl pyrene, condensed ring aromatic hydrocarbon having afluoranthene ring, polycyclic aromatic hydrocarbon such as biphenyl and terphynyl, aliphatic hydrocarbon or the like are used as the coating agent chemical for forming coat on the catalyst surface.

In order to remove residual oil on wall of the various equipment in the third water-rinsing process, a chemical including water, limonene, monoterpenoid, alkanolamine, anionic surface-active agent, glycol solvent or the like is introduced. The chemical is introduced through chemical injection line of the first process. The amount of chemical added during the third water-rinsing process is 0.01 to 0.5 volume percent.

The third process is conducted when the equipment other than the reactor is opened. The third process enables to eliminate a steam purging process for opening ordinary equipment, thereby reducing maintenance term.

The specific implementing step of the cleaning and maintenance method of the petroleum refining plant will be described below.

First, the temperature of the catalyst in the reactor 6 is lowered below 300° C. by decreasing the heating temperature of the furnace 5 prior to starting shutdown operation of the petroleum refining plant 1.

Subsequently, the on-off valve 22 on the feed material supply pipe 21 is closed and the on-off valve 34 of the light oil supply pipe 35 is opened to change the fluid inside the system from process oil to light oil.

After changing into the light oil, recycle operation of the entire system is performed. Specifically, the on-off valve 30 of the transfer line 31 connected to the tower-bottom fluid effluent pipe 27 of the stripper 10 is closed and the on-off valve 32 of the tower-bottom fluid circulating pipe 33 is opened to return the light oil from the tower-bottom fluid effluent pipe 27 to the feed material supply pipe 21 through the tower-bottom fluid circulating pipe 33. The recycle operation is continued until the temperature of the catalyst inside the reactor 6 reaches approximately 160° C.

When the temperature of the catalyst inside the reactor 6 reaches approximately 160° C., the on-off valve 38 of the cleaning fluid supply pipe 39 is opened to supply the chemical as the cleaning agent, such as limonene. The amount of the chemical supplied is 1 to 20 volume percent relative to the light oil inside the system.

After completion of the cleaning fluid supply, the recycle operation is continued for eight hours more. After the recycle operation is completed, the cleaning agent is discharged by a recycle hydrogen gas circulating in the gas-circulation pipe 25.

Subsequently, the light oil as a rinsing fluid is re-introduced from the light oil supply pipe 35 to conduct recycle operation in order to rinse the various process equipment. Simultaneously, in order to form a coat on the catalyst surface, the on-off valve 40 of the chemical supply pipe 41 is opened to supply the chemical such as alkyl naphthalin as a coating agent. The amount of the chemical supplied is 1 to 5 volume percent relative to the light oil in the system.

After the supply of the chemical as the coating agent is completed, recycle operation is conducted for eight hours more while further cooling the catalyst. After completion of the recycle operation, the rinsing fluid (light oil) in the system is discharged. Further, the temperature of the catalyst inside the reactor 6 is lowered below 50° C. only by the recycling hydrogen gas circulating in the gas circulating pipe 25.

Incidentally, the recycle operation is suddenly stopped in the latter half of the recycle operation of the rinsing process to apply an impulse to a dead space (a part in which no fluid is usually circulated) of the equipment by the circulating fluid. The contaminant of the dead space of the process equipment is completely removed by virtue of the impulse effect.

Subsequently, the front and the behind pipes of the reactor 6 are isolated. In other words, the blind is inserted into the flange 24A and 24B respectively disposed to the outlet pipe 23 and the reactor-bottom pipe 23A to isolate the reactor 6. Then, the opening of the catalyst dumping pipe 15 on the bottom of the reactor is opened and the catalyst is dumped out from the dumping pipe 15 by virtue of gravity. Alternatively, a top manhole of the reactor 6 may be opened to unload the catalyst by vacuum.

When the equipment is required to be opened for inspection or the like, the on-off valve 36 of the water supply pipe 37 connected to the feed material supply pipe 21 is opened to introduce water as the second rinsing fluid during dumping operation of the catalyst.

After the water introduction is completed, the recycle operation is conducted for four hours. Then, the water is bypassed from the reactor 6 and is recycled from the pipe 42.

After the recycle operation by water is completed, the on-off valve 30 of the transfer line 31 is opened to transfer the water from the tower-bottom fluid effluent pipe 27 of the stripper 10 to the water tank 13 to discharge water.

The equipment is then opened for inspection.

According to the above-described embodiment, following effects can be obtained.

(1) Since chemical cleaning process of the equipment 4 etc. by a chemical such as limonene, softening process of the agglomerated catalyst inside the reactor 6 and coating process of the surface of the catalyst by a chemical for forming the coat can be performed in harmony, cleaning process of the process equipment 4 etc. and the pipings 20, softening and unloading process of the agglomerated catalyst, and rinsing process of the process equipment 4 etc. can be efficiently conducted. Consequently, the plant shutdown time can be reduced, thereby improving production efficiency.

(2) Since the catalyst agglomerated inside the reactor 6 can be softened by the chemical such as limonene to be particles, the coat can be formed more completely in coating process. Accordingly, the catalyst is less likely to generate heat when the catalyst is unloaded under the air atmosphere, thereby ensuring the safety of the unloading process of the catalyst.

(3) Since the catalyst agglomerated inside the reactor 6 is softened to be particles, the cooling speed of the grained catalyst is increased, thereby reducing the cooling time of the catalyst.

(4) Since the cleaning fluid and the first rinsing fluid is oil, the waste liquid can be re-distilled and collected as light oil, or alternatively, utilized as blend material of heavy oil. Accordingly, there is no burden of waste liquid treatment.

(5) When the equipment is not opened for inspection, second water rinsing can be omitted. Therefore, the equipment of the plant can be chemically cleaned without discharging any waste water.

(6) Since alkali cleaning liquid and rinsing liquid are used in the present embodiment, so-called neutralization cleaning for neutralizing the sulfide inside the equipment while cleaning and rinsing the equipment can be simultaneously conducted. Accordingly, the stress-corrosion cracking by polythionic acid in opening the equipment can be prevented.

Incidentally, the scope of the present invention is not limited to the aforesaid embodiment but includes other embodiments as long as the object of the present invention can be attained.

What is claimed is:

1. A method of cleaning a petroleum refining plant having process equipment including equipment using at least one catalyst which becomes agglomerated during the petroleum refining process and which can be softened with a cleaning fluid and coated with a coating agent, and piping connecting the process equipment, consisting of the sequential steps:
    a first step cleaning the process equipment and the piping and simultaneously softening said at least one agglomerated catalyst occurring inside the process equipment with said cleaning fluid which is selected from the group consisting of an alkali cleaning fluid, limonene, lecithin, polyoxyethylene fatty amide, dimethyl sulfoxide, and nonyl phenol;
    a second step of rinsing the process equipment and the piping and simultaneously coating a surface of the softened catalyst with said coating agent which is selected from the group consisting of condensed ring aromatic hydrocarbons, polycyclic aromatic hydrocarbons, and aliphatic hydrocarbons; and
    a third step of unloading the softened and coated catalyst from the process equipment containing the catalyst and simultaneously re-rinsing the process equipment and the piping.

2. The method according to claim 1, wherein the process equipment and the piping are cleaned by the cleaning fluid having a cleaning and catalyst softening effect introduced into a light oil circulating in said equipment and piping; and
    wherein the process equipment and the piping are rinsed by a first rinsing fluid including the light oil and re-rinsed by a second rinsing fluid including water.

3. The method according to claim 1, wherein the process equipment and the piping are rinsed and the surface of the catalyst is coated during the second step by introducing light oil and the coating agent into the equipment and piping after discharging the cleaning fluid.

4. The method according to claim 2, wherein the process equipment and the piping are cleaned when a temperature of the catalyst is lowered to a predetermined temperature while cooling the catalyst before plant operation is suspended.

5. The method according to claim 2, wherein the softened catalyst is unloaded in the third step after cooling the catalyst to a temperature not higher than 50° C. which is suitable for unloading the catalyst and drawing off the first rinsing fluid.

6. The method according to claim 3, wherein said condensed ring aromatic hydrocarbons comprises at least one of alkyl naphthalene, alkyl anthracene and alkyl pyrene, and said polycyclic aromatic hydrocarbons comprises at least one of biphenyl and terphenyl.

7. A method of cleaning a petroleum refining plant having process equipment including equipment using at least one catalyst which becomes agglomerated during the petroleum refining process and which can be softened with a cleaning fluid and coated with a coating agent, and piping connecting the process equipment, consisting of the sequential steps:
    a first step cleaning the process equipment and the piping and simultaneously softening said at least one agglomerated catalyst occurring inside the process equipment with said cleaning fluid which is selected from the group consisting of an alkali cleaning fluid, limonene, lecithin, polyoxyethylene fatty amide, dimethyl sulfoxide, and nonyl phenol;

a second step of rinsing the process equipment and the piping and simultaneously coating a surface of the softened catalyst with said coating agent which comprises condensed ring aromatic hydrocarbons having a fluoranthene ring; and a third step of unloading the softened and coated catalyst from the process equipment containing the catalyst and simultaneously re-rinsing the process equipment and the piping.

* * * * *